United States Patent [19]

Carlson

[11] 4,228,001
[45] Oct. 14, 1980

[54] FOLDED MOVING BED ION EXCHANGE APPARATUS AND METHOD

[75] Inventor: Lee G. Carlson, Willow Springs, Ill.

[73] Assignee: American Petro Mart, Inc., Bartow, Fla.

[21] Appl. No.: 895,817

[22] Filed: Apr. 12, 1978

[51] Int. Cl.² ............................................. B01D 15/02
[52] U.S. Cl. ................................... 210/676; 210/189; 210/274; 210/289
[58] Field of Search .................... 210/33, 34, 189–191, 210/268, 269, 274, 288, 289, 291

[56] References Cited

U.S. PATENT DOCUMENTS

| | | | |
|---|---|---|---|
| 3,130,151 | 4/1964 | Levendusky | 210/33 |
| 3,152,072 | 10/1964 | Yomiyama et al. | 210/33 |
| 3,515,277 | 6/1970 | Kingsbury et al. | 210/33 |
| 3,531,401 | 9/1970 | Crits | 210/34 |
| 3,847,805 | 11/1974 | Voedisch | 210/291 |
| 4,098,695 | 7/1978 | Novotny | 210/289 |

*Primary Examiner*—Ivars C. Cintins

*Attorney, Agent, or Firm*—Lockwood, Dewey, Alex & Cummings

[57] ABSTRACT

A method and apparatus is provided for removing contaminants or for recovering valuable minerals in trace amounts by ion exchange treatment of liquids such as municipal and industrial waste waters, ore mining and processing tailings, and the like as they flow through a resin bed wherein ions in the liquid are sorbed into the resin by an ion exchange mechanism. The resin bed is a folded, moving bed which exhibits all of the advantages of a packed ion exchange resin bed. Laminar flows are developed throughout the moving bed system to maintain all interfaces intact, even during the rinsing operation, while the moving bed used is of a "folded" type having a maximum height approximately one-third that of conventional countercurrent units. The ion exchange treatment occurs within a loading vessel resin bed, the beads in the feed portion of which become exhausted and sequentially move out of the loading vessel for subsequent regeneration and rinsing, followed by eventual return to the loading vessel.

28 Claims, 3 Drawing Figures

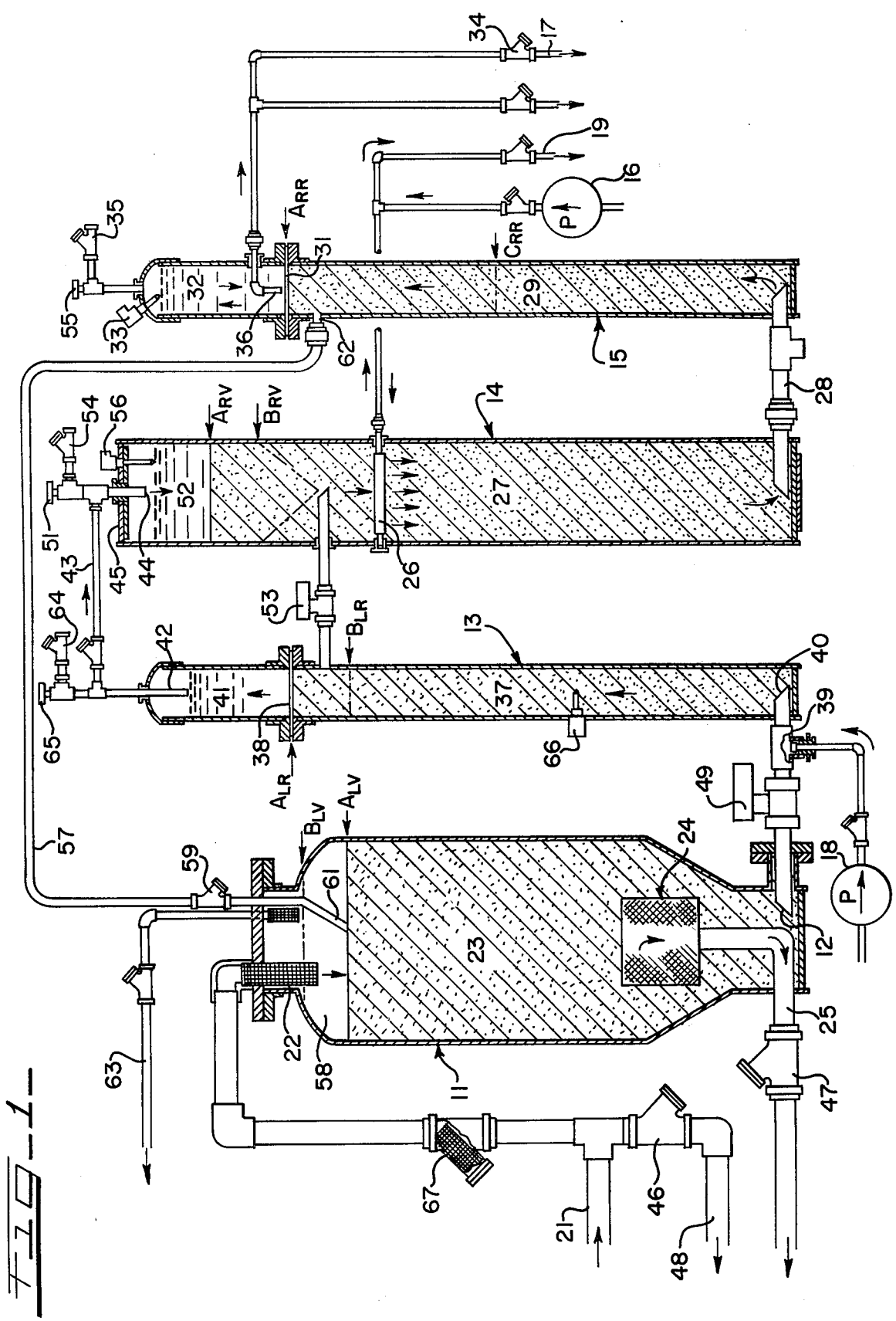

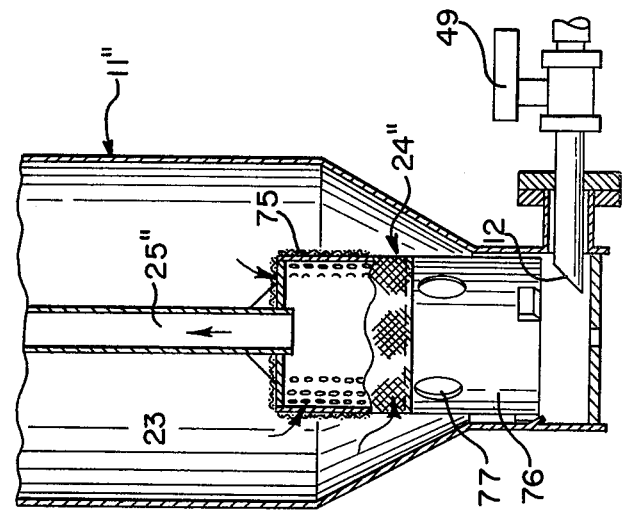
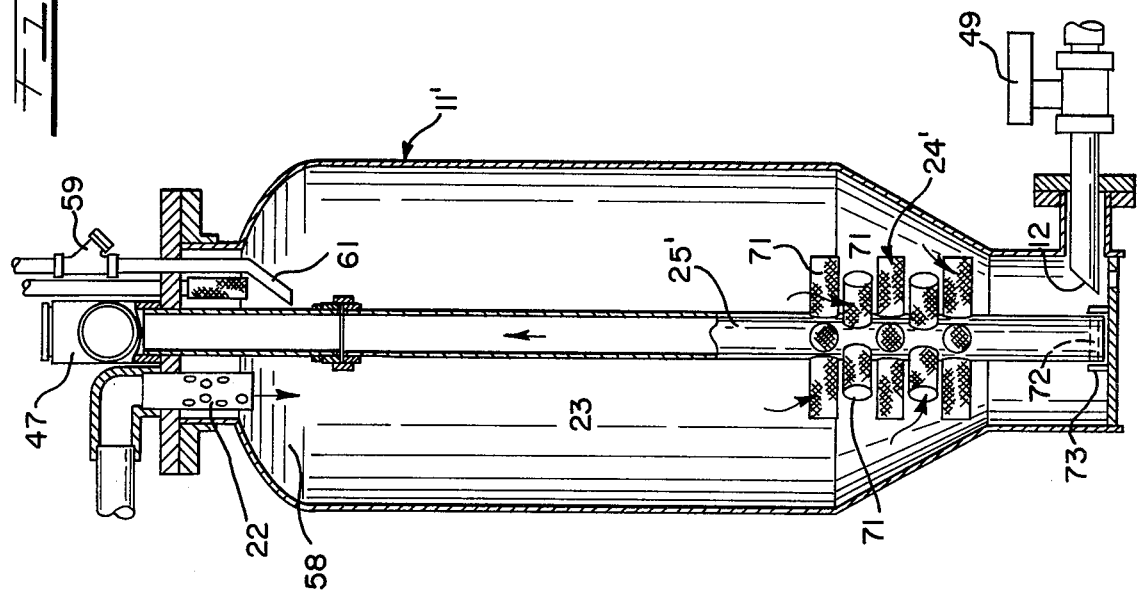

FOLDED MOVING BED ION EXCHANGE APPARATUS AND METHOD

BACKGROUND AND DESCRIPTION OF THE INVENTION

The present invention generally relates to a moving bed ion exchange apparatus and method, especially one incorporating folded resin flows to significantly reduce the height of the apparatus and thus decrease the amount of head space required. More particularly, this invention achieves folded features in a countercurrent system having the ability to accomplish an in-phase and a laminar flow of ion exchange resin during the transfer thereof in a moving bed arrangement. Countercurrent flow of the regeneration and rinsing solutions is practiced while maintaining a packed bed condition even though the system retains the advantages of a moving bed.

Moving bed ion exchange systems are known to have several advantages, especially improved efficiency, over fixed bed systems. Units such as in Higgins U.S. Pat. No. 2,815,322 and Keller U.S. Pat. No. 3,325,011 have a closed loop which incorporates a treating zone through which the liquid to be treated is passed in order to effect an ion exchange, as well as a regeneration zone wherein a regenerating solution is passed through the resin. Between successive service cycles of these systems, the resin is advanced through the closed loop for providing regenerated resin within the treating zone. Keller, for example, shows a treating zone directly above a regeneration zone, and the resin supply is pumped by compressed air to advance from the regeneration zone to the treating zone to force used resin out of the treating zone and to the pumping location. Units such as Yomiyama U.S. Pat. Nos. 3,152,072; Mihara 3,238,125; and Yamashiki 3,378,339, have multiple resin vessels and show resin movement therebetween. They cause feed liquid to flow upwardly which, upon initiation of fluid flow after resin transfer, causes the resin bed to turbulate with great mixing of partially loaded resin with newly regenerated resin and consequent loss in stage transfer heights and cutting of resin regeneration capacity.

While such systems have advantages over fixed-bed systems because regenerated resin is continuously supplied, even those having multiple resin beds have the disadvantages of a loose bed, including development of an out of phase condition, non-laminar movement, and undesirable bed expansion.

The present invention retains the general advantages of moving-bed systems while avoiding the disadvantages of previously known moving-bed systems due to the ability of the present system to incorporate desirable packed-bed attributes into a moving-bed system at all times. In the present invention, when moving the ion exchange resin through and between the various vessels or columns, the liquid-to-resin relationship remains in phase; that is, the liquid does not go faster than the resin so that the interfaces stay intact and at a constant relationship to each other, which brings about a final result of improved ion exchange such that it approaches stoichiometric ratios and such that no excess rinse is required to move the resin interfaces back to their various operational positions. By the present invention, the resin bed is in a packed condition at all treatment times.

In another aspect of this invention, the present system unlike prior art systems does not move the entire resin inventory during the resin transfer, which total movement results in extensive mixing of resin and fluid causing fluid slippage in the direction of resin movement, whereby the liquid moves faster than the bed so that the liquid and the ion exchange resin material are not in contact with each other for a sufficient period of time in order to achieve the desired result, whether that result be an ion exchange or the removal of entrained liquids. When a unit exhibiting fluid slippage goes back on stream after having been shut down for a significant period of time, the chemical efficiency of the unit is lost until the bed repacks itself and re-establishes equilibrium conditions, which could take as long as twenty percent of the time required to complete an entire closed loop cycle for short cycles of several minutes.

Another aspect of this invention brings with it an advantageous "stage height" feature which approximates the functional operation of a fractionating tower whereby, for example, in the regeneration vessel or column, the purest resin is in contact with the purest regeneration fluid; and, as the resin becomes more contaminated in the lower portions of that column, the regenerating liquid likewise becomes correspondingly more contaminated, with the most contaminated regenerating fluid within the regeneration reservoir being in contact with the spent ion exchange resin just received from the treating or loading vessel. Such a stage height feature provides the maximum equilibrium or mass flow kinetic effect possible in such a system.

A still further aspect of this invention is the fact that the various passageways or distributors of the moving resin bed have a very simple construction and may enhance fluid distribution across the resin bed to eliminate channelling. In prior art systems, large hydraulic forces are developed, requiring massive reinforced distributors which caused obstructions to resin flow or requiring a multiplicity of various small distributors at the bottom of the loading vessel, often to the point that the cross-section was almost entirely screened, which developed points of resin stagnation and resistance to resin flow, thereby inhibiting smooth flow distribution in the vicinity of the fluid discharge in the resin bed. These disadvantages are avoided with the present invention by its in-phase and laminar packed bed condition resin movement.

Another problem with previously known moving-bed systems is the need to accomplish additional start up operations after the system has been idle for relatively long periods of time, such as for several weeks. When such previously known systems were left standing idle for long periods of time, the resin would first have to be transferred manually in order to loosen up the resin packed around and obstructing the operation of the valves, this manual operation usually having to be followed by running the system through several cycles in order to place the system into proper startup condition before actually proceeding with the ion exchange operation on the liquid to be treated. Some systems incorporate a pulsing circuit to move resin while off stream. In accordance with the present invention, the system, even after having been idle for several weeks and without a pulsing circuit, can be immediately started up anywhere within the total program cycle without having to manually transfer any resin or run through start-up cycles.

By yet a further aspect of this invention, two complete units thereof are coupled together in an appropriate manner whereby there can be accomplished the processing of water containing either undesirable substances for removal and disposal or desirable substances for recovery and further processing of same to some beneficial use, together with the additional benefit of deionizing the treated water.

It is, therefore, a general object of the present invention to provide an improved apparatus and method for conducting ion exchange operations through a moving resin bed.

Another object of the present invention is an improved method and apparatus which accomplishes an in phase and laminar flow of resin throughout the system while maintaining countercurrent flow, especially to the extent that the resin interfaces throughout the system are maintained intact and in a packed-bed condition.

Another object of the present invention is to provide an improved moving-bed ion exchange resin system which proceeds through sequential steps during which the liquid being treated moves in a downflow manner, with the upper or initial portion of the loading vessel resin bed being removed therefrom for subsequent regeneration, rinsing, and reuse.

Another object of this invention is to provide a system suitable for either removing contaminants such as for water softening, or recovering valuable material such as precious metals from a liquid to be treated, even when only trace amounts of those contaminants or valuable materials are present in the liquid.

Another object of the present invention is to provide a method and apparatus for removing and recovering copper, lead, nickel and the like from the rinse water of a printed circuit manufacturing operation, to the extent that the rinse water is purified so that it is characterized as deionized water which can be recycled for use in the printed circuit manufacturing process itself.

Another object of this invention is to provide a moving-bed resin system wherein a laminar flow is maintained throughout the system whereby the interfaces of the resin remain intact during their flow throughout the system.

Another object of the present invention is to provide an improved ion exchange resin system which is of the moving-bed type affording sequentially continuous operation but which is and has the advantages of a packed bed system.

Another object of this invention is an improved apparatus and method having a "stage height" feature similar in end results to that of a fractionating tower whereby the purest resin is in contact with the purest regenerating fluid and progressively more contaminated resin is correspondingly in contact with progressively more contaminated regenerating fluid.

These and other objects of the present invention will be apparent from the following detailed description of this invention, including the various aspects thereof, taken in conjunction with the accompanying drawings wherein:

FIG. 1 is a schematic elevational view of the preferred downflow, folded moving-bed ion exchange system in accordance with this invention;

FIG. 2 is an elevational view of an alternative embodiment of the loading vessel having a modified treated liquid collecting means; and FIG. 3 is a fragmented elevational view of a loading vessel similar to that of FIG. 2 having another alternative form of treated liquid collecting means.

In the basic operation of the moving-bed system of FIG. 1, the feed liquid to be treated passes down through ion exchange resin within a loading vessel 11. Regenerated and rinsed resin enters loading vessel 11 at an inlet 12 as resin transfer proceeds by movement of the resin interfaces between a loading reservoir 13, a regeneration vessel 14, and a regeneration reservoir 15. Regenerant solution enters the system through a pumping means 16, and proceeds through the lower portion of regeneration vessel 14, up through the regeneration reservoir 15, and out a waste conduit 17. Preferably, rinse liquor enters the system through a pumping means 18, moves through and with interstitial liquid within the loading reservoir 13, passes out of the upper portion of reservoir 13, into the top portion of regeneration vessel 14, and exits from the system through a rinse liquor waste pipe 19. During regeneration, an ion exchange takes place whereby those ions which were sorbed on the resin within the loading vessel 11 are removed from the resin within the regeneration vessel 14, and partially within the regeneration reservoir 15. The rinse liquor washes away the regeneration solution from the interstices between the resin beads and simultaneously pushes back the interfaces of the resin to their position for passage of the liquid to be treated through the loading vessel 11.

With more particular reference to FIG. 1, the feed liquid to be treated is fed into the system through a feed conduit 21 and enters loading vessel 11 through a distributor 22 through a generally closed vessel 11, after which it passes, preferably in a downflow manner, through packed ion exchange resin bed 23 at a loading height $B_{LV}$. After passing through the packed resin bed 23, the thus purified and treated liquid exits the resin bed 23 through a collecting means 24. Means 24 in FIG. 1 takes the form of a cylinder of a diffusing material such as screening or a slotted panel which permits the treated liquid to flow therethrough but blocks passage of individual resin beads from bed 23, a particularly suitable diffusing material being a 60 mesh polyester screening. Feed liquid entering the collecting means 24 is the product treated in accordance with this invention; it passes out of the loading vessel 11 through a product efflux conduit 25.

Treatment of the feed liquid within the packed ion exchange resin bed 23 reduces the ion exchange capability thereof and, in general, substantially exhausts the top interface and upper portion of the resin bed 23, which interface and upper portion are removed from loading vessel 11 and are later regenerated. In order to maintain the loading height $B_{LV}$ during ion exchange treatment of the feed liquor, a regenerated and rinsed supply of ion exchange resin enters the loading vessel 11 through the inlet 12 without disturbing the resin interfaces. Prior to such passage through the inlet 12, the resin had been subjected to regeneration of the ion exchange resin and rinsing the regenerating solution from the interstices of the moving packed resin bed.

More particularly, a regenerating solution, of a predetermined strength, enters the system through the pumping means 16, which may be a centrifugal pump, a gear pump, a piston and cylinder arrangement, an air or hydraulic cylinder device, or the like, preferably being capable of metering the flow of regenerating solution into the system. The regenerating solution then enters the regeneration vessel 14 through a distribution head 26, which may take the form of a tube or a pancake cylinder having a relatively fine mesh passageway therethrough for the passage of liquid such as the regenerating solution, while preventing individual resin beads from entering the head 26.

During this stage, packed resin bed 27 of the regeneration vessel 14 will be at a height $A_{RV}$, and regenerating solution flows downwardly through the lower portion of the regeneration vessel 14 because conduit pipe 28 connecting the regeneration vessel 14 with the regeneration reservoir 15 near the bottom of each is open, while all other possible exit paths from regeneration vessel 14 are closed by suitable valves. Thereafter, the regenerating liquid passes upwardly through the regeneration reservoir 15, containing a packed resin bed 29 at a height $A_{RR}$, which is generally defined by a foraminous plate or screen 31, which prevents passage of individual resins beads therethrough, while permitting passage of regenerating liquid into upper chamber 32 of the regeneration reservoir 15 until the regenerating liquid touches a sensor 33 which causes a valve 34 and a vent valve 35 to open, thereby permitting the metered amount of regenerating solution, now a waste liquor, to be discharged out of the upper chamber 32 by means of a downcomer 36 while the screen 31 maintains bed 29 in its packed condition. Regenerating liquid and resin remain in contact for about 30 minutes.

While this regeneration is proceeding, a packed resin bed 37 is maintained within the loading reservoir 13, generally at a height $A_{LR}$ defined by another foraminous plate or screen 38. Pumping means 18 introduces a fixed amount of rinse liquor, which may be treated liquid, deionized water, or the like near the bottom of loading reservoir 13 for the purpose of washing away regenerating solution remaining between the interstices of the packed resin bed 37, while at the same time providing hydraulic forces which pass a block of packed resin from out of transfer pipe 39, through opening 40, and into the loading reservoir 13, which block will push the bottom interface of the resin bed 37 upwardly until it reaches level $A_{LR'}$, all while providing locking forces for the fully packed condition of the resin bed 37.

This rinse liquor mixes with and dilutes the regenerating solution removed from the interstices of the bed 37 and this diluted regenerating solution passes through screen 38, continues to proceed into upper chamber 41 of the loading reservoir 13, exits through a downcomer pipe 42 and conduit 43, and flows into the upper portion of the regeneration vessel 14 by passing out of a screened outlet 44 through an otherwise closed top 45 of the regeneration vessel 14. Solution remains in chamber 41 to prevent channeling through and drying of bed 37. Such diluted regenerating solution continues to pass through the upper portion of the packed resin bed 27 until it enters distribution head 26 for exit through the rinse liquor waste pipe 19, after which it may be used, at least in part, to dilute a concentrated regeneration solution to the appropriate strength prior to being passed into the system through the pumping means 16. Portions of the diluted regenerating solution passing through pipe 19 may be further processed for proper disposal. For simple systems, the rinse liquor may be added in a fixed amount. In more complex systems, it may be desirable to add amounts that vary depending upon the amount of rinsing needed as determined by a sensor 66 which may be a conduntivity probe.

After these regeneration and rinsing procedures, a block of fresh resin from the loading reservoir 13 is ready for passage into the opening 40, through the transfer pipe 39, and out the inlet 12, the resin levels at the beginning of this particular stage being the levels $A_{LV}$, $A_{LR}$, $A_{RV}$ and $A_{RR}$, which are illustrated by cross-hatching in FIG. 1. During this resin transfer stage, the liquid to be treated preferably does not pass into the system through the distributor 22. Instead, a bypass valve 46 is opened, an exit valve 47 is closed, and the feed liquid simply returns to its feed well (not shown) through bypass conduit 48.

Resin transfer proceeds when a resin valve 49, which is of a type that permits passage of packed resin but resists damage thereby, such as a ball valve or a specially designed butterfly valve, is opened and pneumatic means initiate passage of resin therethrough. A source of compressed air under low positive pressure is introduced by means of a valve 51 into the upper portion of the regeneration vessel 14, which exerts pressure upon the diluted regeneration solution liquid 52 remaining on top of the packed resin bed 27. A resin valve 53 opens to provide passageway between the regeneration vessel 14 and the loading reservoir 13, with the result that the pressurized air which is exerting a pneumatic force on the liquid 52, which transmits that force to the resin within the upper portion of the regeneration vessel 14, causes this resin to pass through the open resin valve 53 and into the loading reservoir 13, which in turn exerts pressure upon the packed bed 37. Since the screen 38 blocks resin passage upwardly, the entire packed bed 37 will move downwardly, the movement being one of laminar flow and one that is in phase with the interstitial liquid contained in the resin bed 37, to the extent that a block of resin moves through the transfer pipe 39 by way of the open resin valve 49 and into the bottom of the loading reservoir 13 through the inlet 12, thereby upwardly pushing the packed ion exchange resin bed laminarly upwardly and in phase with the interstitial liquid within bed 23 until a level $B_{LV}$ is reached. The amount of resin thus transferred into the loading vessel 11 is a fixed amount that is controlled by means of a vent 63 and/or the screened distributor 22 which functions as a resin dam or by suitable sensors at strategic locations within the loading vessel 11 and/or the loading reservoir 13. For safety reasons, it may be desirable to add a screened trap 67.

Optionally, especially when a large volume of resin is to be transferred or an additional liquor is needed to especially condition the resin with a particular media, such as an acidic or a basic one, to provide optimum conditions for resin exchange in resin bed 23, valve 53 is closed, and valves 64, 49 and 46 are opened to permit low pressure air or special liquor to enter upper chamber 41 and force the block resin movement into bed 23. Another valve 65 is opened to vent or to remove special liquor.

At this stage, the top surface of the packed resin bed 27 will be at a level $B_{RV}$, which generally takes a somewhat conical shape such as that illustrated in FIG. 1, with the liquid 52 standing above the level $B_{RV}$, and pressurized air at about 2-20 psi, preferably 3-10 psi, remaining above liquid 52 until it is released by opening a vent valve 51 after resin transfer into the loading vessel 11, at which time resin valve 49 and resin valve 53 are then closed, thereby locking the respective resin beds at approximately levels $B_{LV}$, $B_{LR}$ and $B_{RV}$.

Next, the regeneration vessel 14 will be refilled with packed resin from the regeneration reservoir 15 so that the level of the packed resin bed at 27 will return approximately to level $A_{RV}$. Vent valve 51 remains open, and compressed air, at about 2 to 20 psi, preferably 3–10 psi, enters the upper chamber 32 to pass through the screen 31 and exert a pneumatic force downwardly on the packed resin bed 29 to move it down to level $C_{RR}$ as the lower portion of packed resin bed 29 moves laminarly downwardly and through the pipe 28, to move the packed resin bed 27 laminarly upwardly until it approximates level $A_{RV}$. Valve 35 closes and the compressed air supply ceases when the liquid 52 is contacted by a sensor 56 within the regeneration vessel 14, after which the vent valve 51 also closes, and vent valve 55 opens to release the compressed air from upper chamber 32 of the regeneration reservoir 15, thereby equalizing the pressure on the resin bed surfaces within the regeneration vessel 14 and within the regeneration reservoir 15.

In order to refill the regeneration reservoir 15 with resin and remove spent or exhausted resin from the upper portion of the loading vessel 11, a resin slurry transfer conduit 57 is provided. It is preferred in large capacity units that the resin slurry transfer conduit 57 passes resin while the feed liquid being treated is circulating through the packed ion exchange resin bed 23 within the loading vessel 11. During such flow passage, there is a pressure drop of several pounds down through the resin bed 23, which pressure drop will pass the resin from out of dome 58 of vessel 11 and through the resin slurry transfer conduit 57 when a further resin valve 59 is opened. Spent resin leaves through a dip tube 61 within the dome 58, the resin being pushed therethrough by the incoming feed liquid from the distributor 22. Actually, the material passing through resin transfer conduit is a slurry of spent resin and feed liquid. This resinous slurry enters the regeneration reservoir 15 at aperture 62, which slurry displaces much of the air remaining in the regeneration reservoir 15 on top of the liquid above resin level $C_{RR}$, the air being displaced through the opened vent valve 55, while the resinous slurry entering through aperture 62 continuously raises the level $C_{RR}$, generally until it reaches a height approximating the level $A_{RR}$, with the liquid from this slurry passing through the screen 31 and into the upper chamber 32 until it activates the sensor 33 which in turn will generate a signal to close the resin valve 59 and the vent valve 55.

At this stage, all of the resin levels will have been returned to their respective levels $A_{LV}$, $A_{LR}$, $A_{RV}$ and $A_{RR}$ so that the system will be ready for the next resin transfer sequence.

FIG. 2 depicts an alternative embodiment of the loading vessel. A loading vessel 11' is substantially the same as loading vessel 11 and operates in substantially the same manner, the principal difference being in the structure of the collecting means 24', which is in the form of a "staggered X" or "tree branch" arrangement having spaced and staggered arms 71, constructed of mesh material such as screening or closely slotted sheeting, preferably in the shape of a cylinder, which multiple arms 71 provide particularly efficient passage of the treated feed liquid from out of the packed ion exchange resin bed 23 into the product efflux conduit 25'. In this embodiment, the product efflux conduit 25' passes the treated feed liquid out of vessel 11' and through exit valve 47 from above the dome 58. Typically, the transfer conduit means 25' will include a plug 72 in the bottom thereof resting within a flange 73 to facilitate removal of the collecting means 24' without having to remove the ion exchange packing from the bottom of the loading vessel 11'.

A further alternative structure of the loading vessel is shown in FIG. 3, the loading vessel 11" having a collecting means 24". Treated feed liquid flows upwardly through a transfer conduit means 25" after entering the collecting means 24", which includes an inverted cup mesh collection member 75 that permits passage of the feed liquid therethrough but prevents passage of ion exchange resin beads from resin bed 23 into the collecting means 24". Immediately below the inverted cup mesh 75 is a collar 76 having passageways 77 for permitting the resin to pass therethrough and into the loading vessel 11" when same is refilled during resin transfer. This structure also permits removal of the collecting means 24" for cleaning and the like without having to pass the resin bed out the bottom of the vessel 11".

When it is desired to produce a final liquid product that is deionized, duplicate systems (not shown) may be provided, whereby the structure shown in FIG. 1 is substantially repeated, and the transfer conduit means 25 is connected by a suitable conduit (not shown) for communication with a conduit on the order of feed conduit 21. In such a double system, the resin movement in each system is substantially the same as that in the single system, with the units being synchronized so that each of the cation and the anion loading vessels are off stream at that point where the freshly regenerated resins are transferred into each vessel. Anion vessel is downstream of cation vessel conduit 25.

In proceeding with the method in accordance with this invention, substances are removed from a feed liquid to be treated, the substances are generally in the ionic form, but they may also be complexed ions in a weakly ionic form to thereby either clarify the feed liquid and/or recover valuable materials therefrom, trace amounts being removed in either case. The method proceeds in a folded manner to avoid the requirement of having extensive head space to accomplish the method. Packed resin beads are recycled in the manner of a moving bed, and various liquids pass therethrough. In all cases, the movement of the liquid does not move any faster than the resin whereby the numerous interfaces between the liquid and the resin maintain constant relationships between one another in order to enhance and maximize the ion exchange process so that it approaches stoichiometric ratios and to avoid excess rinsing. Additionally, as a consequence of the laminar and in phase movements, no resin bed expansion is experienced which would bring with it a consequent loss of the packed bed effect and its attendant superior ion exchange properties.

In general, when the feed liquid being treated has a relatively high concentration of ions or complexed ions to be removed therefrom, the moving resin bed will be circulated relatively frequently; and when the feed liquid being treated exhibits a low concentration of ions and/or ion complexes, circulation of the moving resin bed is accomplished less frequently. The ion exchange operation within the loading vessel 11 sorbs the ions to be removed and/or collected into the packed ion exchange resin bed, such ions releasing and replacing other ions which had been in the sites located in the resin beads in order to effect a beneficial exchange of ions. This exchange phenomenon requires that the resin beads have a greater affinity for the ions to be removed from the feed liquid than for the ions in the fresh resin, which calls for an appropriate selection of resin beads, such appropriate selection being in accordance with principles known in the art and published specifications on particular resin beads.

Usually, while the ion exchange takes place, an upper portion of the resin beads having undergone this ion exchange are passed in slurry form with feed liquid being treated from out of the top of the packed resin bed or column and into a regeneration reservoir column, preferably near the top thereof, for a regeneration step which takes place partially in the resin reservoir column and more directly in a regeneration step, those contaminating or valuable ions which were sorbed into the resin beads within the loading column are exchanged by means of a regenerating liquor with fresh ions for subsequent exchange with other contaminating or valuable ions in the moving resin bed or column. Utilizing both a regeneration reservoir column and a regeneration column contributes to the ability to carry on this method as a folded one, within a relatively low location.

The regeneration step includes pumping the regenerating solution through a distribution head area downwardly through at least a large portion of the regeneration column which includes closely packed resin beads being recycled. The regenerating liquor continues to pass through the system, upwardly through the regeneration reservoir column, until it passes through a screen or membrane which prevents resin passage, until it reaches a predetermined height at which time the used regenerating solution, having been turned into a waste liquid, is allowed to pass out of the system.

A rinsing or washing step is also accomplished, at which time the regenerated resin beads standing within a loading reservoir column are washed with a rinse liquor by passing the rinse liquor, together with a plug of resin, into the loading reservoir column near its bottom end, thereby raising the level of resin within the loading reservoir column while at the same time passing the rinse liquor upwardly through the entire column for movement through and with the interstitial liquid remaining within this column in order to form a regenerating solution diluted with the rinse liquor, which mixture passes out of the top end of the loading reservoir column and down into and through at least a top portion of the regeneration column for collection therewithin and for partial removal from the system through the distribution head area.

This step of passing the diluted regenerating solution mixture through at least a portion of the resin within the regeneration column accomplishes an initial washing of such resin in order to begin to remove the residual regeneration solution within the interstices of the resin beads. The rinse liquor used in this step may be a portion of the feed liquid that has been treated by passage through the loading resin bed or column, or it may be deionized water or the like. The extent of the washing operation within the loading reservoir column is significantly facilitated by the provision of a screen or membrane resin barrier within the loading reservoir column to prevent passage of resin beads therethrough while permitting the rinse liquor to pass which results in washing away residual regenerating liquid by a sieve action, with the further result that the resin within the loading reservoir column is moved up to the height of the screen or membrane resin barrier.

In an alternative embodiment, it is possible to simultaneously proceed with the regeneration step as well as the rinsing step by locating another liquid distribution head area for introducing the regenerating liquid within the regeneration column several inches below the other distributing head area which will be used exclusively as a diluted regenerating mixture outlet from that column. A certain amount of somewhat undesirable mixing of the fresh regenerating liquid and the diluted regenerating mixture would result by this alternative embodiment, causing a dilution of the regenerating liquor prior to its passage through the regeneration column. Such a slight disadvantage is of no particular consequence in operations wherein the equilibria of the ions and the concentrations being treated is especially favorable, such as when the system is used in water softening operations. Where such favorable conditions are not present, such as in hydro-metallurgical operations, it is preferred that the regeneration and rinsing steps be performed serially, with the rinsing operation being performed first, followed by the regeneration operation. In an especially advantageous arrangement, the regeneration step is followed by a second or final rinsing operation to be certain that no regeneration solution has worked its way up the resin within the regeneration column by virtue of capillary action or air pockets being present in the top thereof.

After the liquid to be treated flows through the packed ion exchange resin loading bed or column, the loading column moves generally upwardly in a laminar manner and the top portion thereof is removed therefrom in order to replace the most extensively spent resin beads with freshly regenerated resins beads within the packed loading column.

The resin transfer operation basically includes three resin movement steps. Prior to these resin movement steps, the respective resin columns will be at levels $A_{LV}$, $A_{LR}$, $A_{RV}$ and $A_{RR}$ depicted in FIG. 1.

In the first such step, regenerated and rinsed resin is transferred into the bottom of the packed ion exchange resin loading bed or column by pneumatic action of air compressed to a pressure of about 2 to 20 pounds per square inch upon the diluted regenerating liquid mixture above the regeneration column, which pneumatic action passes resin to level $B_{RV}$ and from the regeneration column to a location near the top of the loading reservoir column to move that column downwardly in laminar fashion and into the packed ion exchange resin loading column to urge this loading column upwardly in a laminar fashion until it reaches level $B_{LV}$. This step generally transfers the resin in a fixed amount, and the extent of the movement is regulated by a time and air pressure relationship for passing the correct amount of compressed air into the top of the air regeneration column. Thereafter, the compressed air is released to complete this step of the resin transfer operation.

At the completion of the previous step, the resin in regeneration column is depleted, and the next step replenishes the column to about its original level $A_{RV}$ by passing resin from the bottom of the regeneration reservoir column into the bottom of the regeneration column, the movement being laminar and in phase with the resin interstitial volume. This passage is accomplished by injecting compressed air into the top portion of the resin regeneration column, which creates a pneumatic force on residual liquid above the resin in this column to thereby move the resin in a laminar manner which is in phase with the interstitial liquid therewithin.

In the next step, the spent resin of the packed ion exchange resin loading bed or column is transferred to the top of the regeneration reservoir column for subsequent regeneration and rinsing thereof. This step may be accomplished simultaneously in association with the passage of the feed liquid through the loading column which brings about a pressure drop of several pounds from its inlet location to its outlet location, the amount of the pressure drop being dependent upon the average size of the inlet compared with the average size of the outlet, the height of the resin bed, and the temperature and viscosity of the incoming liquid being treated.

A usual minimum pressure drop for small capacity unit is 2 psi. Preferably, the flow should be as gentle as possible to minimize resin attrition brought about by resin bead breakage at fast flow rates while being fast enough to keep the down time at a minute or less. Generally, with a flux of about 25 to 30 gallons/minute/square foot and at room temperature, the effective pressure drop will be about 5 psi for each foot of depth of the effective height of the loading column resin bed, usually about 2 to 3 feet. Such pressure drop will cause a transfer of a fixed volume of resin slurried with feed liquid from the loading column after passageway therefrom is provided to the regeneration reservoir column, generally until it reaches its original level $A_{RR}$, at which level liquid in the slurry is separated from the resin beads and the regeneration resin column is packed by the sieve-action of another screen resin barrier.

It has been found that resin requirements are optimized by including about half of the total system resin volume within the loading column or bed and the other half distributed throughout the other three columns, the preferred volume ratios being about 4:1:2:1 for the columns as viewed from left to right in FIG. 1.

Throughout each resin transfer step, the resin transfer proceeds without disturbing the interfaces or stage heights of the individual resin beds or columns, with the sole exception that the volume of resin actually transferred from column to column will be mixed to some degree as it passes through the appropriate passageways. The preferred downflow passage through the loading column or vessel has an important advantage over an upflow passage therethrough by automatically maintaining a packed bed condition therewithin even as attrition of the resin beads takes place. Any attrition will merely lower the levels $A_{LV}$ and $B_{LV}$, rather than cause gaps to develop in the loading vessel and consequent undesirable channeling as will occur in an upflow unit unless it is attended for the purpose of adding resin into the system to make up for attritions.

By the preferred moving bed system, the regenerated resin entering the loading column has been regenerated to 80% or more of its initial, unused condition to bring about ion transfer on the order of a fresh, fixed bed. This is especially important when deep downflow loading columns are involved since acidic conditions increase down the depth of the column, which acidic conditions tend to bring about undesirable reverse ion exchange, this tendency being decreased significantly under equilibrium conditions having only about 20% inactive resin rather than about 50% inactive resin for prior systems.

The following specific examples will more precisely illustrate the invention and teach the procedures presently preferred for practicing the same, as well as the improvements and advantages realized thereby.

EXAMPLE I

Tap water was treated within an apparatus on the order of that shown in FIG. 1 and having a loading vessel diameter of 6 inches, a regeneration vessel having a diameter of 3 inches, a loading reservoir having a 3-inch diameter and a half-sized effective depth, and a regeneration reservoir having a 3-inch diameter and a half-sized effective depth so that the volume of resin within the loading vessel is about the same as the total resin volume of the other three vessels combined. The cold tap water was fed at a rate of 7.7 flux (gallons/minute/square foot) at its tap temperature of about 40° F. and was analyzed to include 116 ppm Calcium, 40 ppm Magnesium, and 70 ppm Sodium. After treatment the analysis indicated zero Calcium, zero Magnesium, and trace Sodium. Used as the hydrogen cycle ion exchange resin was a strong cation resin HCRW (Dow Chemical Company). The regenerating solution was 10% hydrochloric acid which flowed for about 45 seconds at a rate of 2.61 grams/minute on a 100% HCl basis, which was 5% above the stochiometric ratio in order to provide a safety cushion. Decationized water was the rinse liquor having a flow time of 45 seconds. The apparatus was set for a cycle of 3 minutes, having a 30 second down time for resin movement, the feed time through the loading vessel being 2½ minutes.

A particularly high regeneration level was attained, the regenerated resin having a capacity of 1.8 out of 2 equivalents per liter of resin, or at 90% capacity even though the regenerating solution utilized was at approximate stochiometric ratio to the resin. By comparison, other moving-bed systems, such as those according to Higgins U.S. Pat. No. 2,815,322, operate in the field at a capacity of about 0.8 to 1.0 out of 2 equivalents per liter of strong cation resin, or at about 40% to 50% of capacity.

EXAMPLE II

To the tap water treated in Example I was added 3200 ppm Nickel as Ni; 48 ppm Calcium as Ca; and 148 ppm Sodium as Na. It was passed through the apparatus of Example I set for the same 3-minute cycle having a down time of 30 seconds, the analyses being 1.0 ppm Ni; zero Ca; and 3 ppm Na. A total of 450 cc of the regenerating solution of 10% hydrochloric acid was needed to regenerate the HCRW resin, which was 4% over the stochiometric ratio. The capacity was 1.8 out of 2 equivalents per liter.

EXAMPLE III

A double structured deionized unit repeating the structure of FIG. 1 was used in a field test for lead removal from a printed circuit rinse liquor at a temperature of about 33° F. The loading vessels had diameters of 8 inches, the cycle time was 15 minutes, including a 30 second down time and a flow through time of 14½ minutes, and the rate was 25 flux (gallons per minute per square foot). Before treatment, the analyses were 50 ppm Copper as Cu; 15 ppm Lead as Pb; and 70 ppm Calcium as Ca. After treatment they were each analyzed at 0.05 ppm. On the cationic side, HCRW strong cationic resin was used, the regenerating solution was 10% hydrochloric acid, and deionized water was the rinse liquor. On the anionic side, the resin used was a strong anionic resin called SPR (Dow Chemical Company), a 4% caustic was used to regenerate, and the rinse liquor was deionized water. To provide a safety leeway, the regenerants were added at 10% above stochiometric resin treatment levels. No capacity analyses were made.

EXAMPLE IV

An apparatus similar to FIG. 1 was run at cycles varying between about 10 to 15 minutes, each having a 30-second down time in order to recover uranium that was leached with HCl as a 1000 ppm $U_3O_8$ complex. Sorption was accomplished at a flux of 20 gallons per minute per square foot. Increasing the flux to 35 gallons per minute per square foot permitted a 100 ppm break through of the uranium complex. A high capacity of regeneration was observed.

EXAMPLE V

Example IV was substantially repeated, except the uranium ore had been subjected to a carbonate leach and the sorption was accomplished at approximately a 1000 ppm $U_3O_8$ level.

EXAMPLE VI

Uranium ore leached with sulfuric acid was treated substantially as in Example IV. Sorption was accomplished at about 1000 ppm of $U_3O_8$, and the flux rate was also increased to allow a 100 to 150 ppm $U_3O_8$ break through.

It will be apparent to those skilled in this art that the present invention can be embodied in various forms; accordingly, this invention is to be construed and limited only by the scope of the appended claims.

I claim:

1. A packed moving-bed ion exchange apparatus, comprising:
    a loading vessel having a feed conduit and a collecting means for passing a feed liquid through a packed ion exchange resin bed therewithin, said loading vessel having a resin inlet and a resin outlet;
    a loading reservoir in resin-passing communication with said resin inlet of the loading vessel through a transfer conduit and through a resin valve between said resin inlet of the loading vessel and said transfer conduit, said loading reservoir containing a movable packed resin bed;
    a regeneration vessel in resin-passing communication with said loading reservoir, said regeneration vessel having a movable packed resin bed and a liquid distribution head therewithin, said distribution head being below said communication of the regeneration vessel to the loading reservoir;
    a regeneration reservoir in resin-passing communication with said regeneration vessel at a location below said distribution head, said regeneration reservoir having a movable packed resin bed therewithin;
    pumping means for passing regenerating solution into said regeneration vessel through said distribution head;
    pumping means for moving rinse liquor through said resin bed of said loading reservoir, said pumping means having an outlet opening into said transfer conduit, said pumping means outlet being closed to said loading vessel by said resin valve for pumping said rinse liquor together with a plug of resin upwardly into said loading reservoir;
    pneumatic means in association with said regeneration vessel for laminarly moving a portion of the resin bed within said regeneration vessel into said loading reservoir to pass resin from said loading reservoir into said loading vessel; and
    a resin slurry transfer conduit communicating said resin outlet of the loading vessel with said regeneration reservoir.

2. The apparatus of claim 1, wherein said feed conduit includes a distributor and passes feed liquid through a top of said loading vessel, and wherein said collecting means is within said loading vessel near the bottom thereof, whereby the feed liquid downflows through said packed ion exchange resin bed of the loading vessel.

3. The apparatus of claim 1, wherein said collecting means includes diffusing material that permits feed liquid to flow therethrough and that blocks passage of individual resin beads therethrough.

4. The apparatus of claim 3, wherein said diffusing material of the collecting means is of a cylindrical shape.

5. The apparatus of claim 3, wherein said diffusing material of said collecting means is shaped as a plurality of spaced and staggered arms.

6. The apparatus of claim 5, wherein said collecting means further includes a product efflux located within said loading vessel and passing therethrough at a top portion thereof.

7. The apparatus of claim 3, wherein said diffusing material of the collecting means is of an inverted cup shape and said collecting means further includes a collar below said inverted cup diffusing material, said collar having pasageways for resin passage through said collar.

8. The apparatus of claim 7, wherein said collecting means further includes a product efflux conduit located within said loading vessel and passing therethrough near a top thereof.

9. The apparatus of claim 1, further including a conduit pipe communicating said regeneration vessel with said regeneration reservoir at respective bottom portions of each, a screen defining an upper chamber of said regeneration reservoir, and a waste conduit in communication with said upper chamber, said regenerating solution pumping means circulating regenerating solution through said liquid distribution head, downwardly in said regeneration vessel, through said pipe, upwardly in said regeneration reservoir, through said screen therein, into said upper chamber thereof and out of said apparatus through said waste conduit, said screen providing locking forces for maintaining said movable packed resin bed of said regeneration reservoir in a packed condition.

10. The apparatus of claim 1, wherein said transfer conduit opens into said loading reservoir at a bottom portion thereof, a screen defining an upper chamber of said loading reservoir, a conduit communicating said loading reservoir upper chamber with said regeneration vessel at a top portion thereof, and a rinse liquor waste pipe connected to said liquid distribution head, said rinse liquor pumping means circulating rinse liquor through said transfer pipe and opening, upwardly in said loading reservoir, through said screen therein, into said upper chamber thereof, through said conduit, downwardly in said regeneration vessel, through said liquid distribution head, and out of said apparatus through said rinse liquor waste pipe, said screen providing locking forces for maintaining said movable packed resin bed of said loading reservoir in a packed condition.

11. The apparatus of claim 1, further including a compressed air source having a valve opening into an upper portion of said regeneration vessel, a resin valve along said resin passing communication between the regeneration vessel and the loading reservoir, said communication being below a screen within said loading reservoir, and said compressed air valve, when open, exerts pneumatic pressure on said movable packed resin bed of the regeneration vessel to move resin through said resin valve from the regeneration vessel into the loading reservoir, said screening cooperating to exert downward pressure on and downwardly move said movable packed resin bed of the loading reservoir through said resin valve out of the loading reservoir and into the loading vessel.

12. The apparatus of claim 1, wherein said pneumatic means for passing resin from said loading reservoir to said loading vessel includes a valve opening into an upper chamber of said loading reservoir for permitting fluid to enter said upper chamber to exert a force upon liquid therewithin above said movable packed resin bed of the loading reservoir.

13. The apparatus of claim 1, further including screen defining an upper chamber of said regeneration reservoir, a compressed air source having a valve opening into said regeneration reservoir upper chamber, and an open vent valve within said regeneration vessel, whereby opening said compressed air valve exerts a pneumatic pressure through said screen and onto said movable packed resin bed of the regeneration reservoir to move a portion of same through said communication into the regeneration vessel to replenish said movable packed resin bed of the regeneration vessel.

14. The apparatus of claim 1, further including a valve in said resin slurry transfer conduit and a screen defining an upper chamber of said regeneration reservoir.

15. A packed moving-bed ion exchange method, comprising:
   providing a movable packed ion exchange resin bed within a plurality of columns, said plurality including a loading column, a loading reservoir column, a regeneration column, and a regeneration reservoir column;
   flowing a feed liquid through said loading column to remove ionic materials therefrom;
   washing said loading reservoir column and a portion of said regeneration column by passing a rinse liquor therethrough, said washing step including a resin raising step by pumping said rinse liquor together with a plug of resin upwardly into said loading reservoir column;
   regenerating at least a portion of said regeneration column and said regeneration reservoir column by passing a regenerating solution therethrough;
   a first resin movement step for transferring a portion of washed loading reservoir column into said loading column by a laminar movement;
   a second resin movement step for transferring a portion of said regeneration reservoir column into said regeneration column by a laminar movement; and
   a third resin movement step for transferring a spent portion of said loading column into said regeneration reservoir column.

16. The method of claim 15, wherein said flowing step creates a pressure drop through said loading column, said pressure drop causing the third resin movement step and said flowing being downwardly.

17. The method of claim 15, further including moving each of the liquids in phase with said resin movement steps, said liquids including the feed liquid, the regenerating solution and the resin liquor, said in-phase moving steps moving the liquids no faster than the movement of said movable resin columns to maintain generally constant relationships between interfaces of said liquids and said resin and maximize ion exchange to approach stoichiometric ratios, to avoid excess rinsing, and to maintain a packed bed condition by avoiding bed expansion.

18. The method of claim 15, wherein said third resin movement step transfers a slurry of feed liquid and spent resin from an upper portion of said loading column.

19. The method of claim 15, wherein said regenerating step has a stage height feature and includes passing said regenerating solution downwardly through resin intersticies in a lower portion of said regeneration column, flowing the regenerating solution from a bottom location of the regeneration column to a bottom location of the regeneration reservoir column, passing the regenerating solution upwardly through resin intersticies in said regeneration reservoir column to develop a waste liquid, moving said regenerating solution waste liquid through a regeneration reservoir column screen preventing passing of resin therethrough, and effluxing said waste liquid therefrom.

20. The method of claim 15, wherein said washing step includes passing said rinse liquor upwardly through resin intersticies in said loading reservoir column to form a mixture of regenerating solution diluted with rinse liquor, moving said diluted mixture through a loading reservoir column screen preventing passage of resin therethrough, passing said diluted mixture from above said screen to a location above said regeneration column, passing said diluted mixture downwardly through resin intersticies in an upper portion of said regeneration column, and effluxing said diluted mixture therefrom.

21. The method of claim 15, wherein said washing step is carried out generally simultaneously with said regenerating step.

22. The method of claim 15, wherein said washing step is carried out prior to said regenerating step, and further including a final rinsing step after said regenerating step.

23. The method of claim 15, wherein said first resin movement step includes applying a supply of compressed air above said regeneration column, pneumatically transferring resin from an upper portion of said regeneration column into an upper portion of said loading reservoir column, and restricting upward movement of said loading reservoir column, thereby effecting said transferring of a portion of said loading reservoir column into said loading column, this transferring step being of a lower portion of said loading reservoir column to raise said loading column by resin movement at a lower portion thereof.

24. The method of claim 15, wherein said second resin movement step includes applying a supply of compressed air above said regeneration reservoir column, pneumatically moving said regeneration reservoir column downwardly to effect said transferring of a portion of said regeneration reservoir column into said regeneration column, this transferring step being of a lower portion of said regeneration reservoir column to raise said regeneration column by resin movement at a lower portion thereof.

25. The method of claim 15, wherein said third resin movement step includes creating a pressure drop of at least about 2 psi for each foot of effective height of said loading column during said flowing step, said flowing step being a downflowing step, forming a slurry of feed liquid and said spent resin from an upper portion of said loading column, effecting said step of transferring spent resin to said regeneration reservoir column, this transferring step being of said slurry to an upper portion of said regeneration reservoir column, and restricting upward movement of said regeneration reservoir column to separate slurry liquid from slurry resin.

26. The method of claim 15, wherein said loading column includes about the same volume of resin as the total volume of the resin within the loading reservoir column, the regeneration column, plus the regeneration reservoir column, the volume ratios of each said columns being 4:1:2:1, respectively.

27. The method of claim 15, wherein said combination of steps regenerates said movable packed ion exchange resin bed to at least about 80% of its exchange capacity at the time of said first resin movement step, resulting in a step of minimizing reverse ion exchange by acidic or basic conditions within said loading column.

28. The method of claim 15, wherein each of said steps is repeated whereby feed liquid is first subjected to a flowing step to remove cationic materials therefrom and is thereafter subjected to another flowing step to remove anionic materials therefrom to deionize said feed liquid.

* * * * *

UNITED STATES PATENT AND TRADEMARK OFFICE
CERTIFICATE OF CORRECTION

PATENT NO. : 4,228,001
DATED : October 14, 1980
INVENTOR(S) : Lee G. Carlson

It is certified that error appears in the above-identified patent and that said Letters Patent are hereby corrected as shown below:

Column 15, line 6, "screening" should be --screen--.

Column 15, line 44, "liquior" should be --liquor--.

Signed and Sealed this

Thirteenth Day of January 1981

[SEAL]

Attest:

SIDNEY A. DIAMOND

Attesting Officer

Commissioner of Patents and Trademarks